(12) United States Patent
Veiseh et al.

(10) Patent No.: US 7,725,715 B2
(45) Date of Patent: May 25, 2010

(54) SYSTEM AND METHOD FOR THREE-PHASE DATA ENCRYPTION

(75) Inventors: Nima Veiseh, Grand Haven, MI (US); David W. Baarman, Fennville, MI (US); Thomas Jay Leppien, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 943 days.

(21) Appl. No.: 11/064,912

(22) Filed: Feb. 24, 2005

(65) Prior Publication Data

US 2006/0190728 A1 Aug. 24, 2006

(51) Int. Cl.
*H04L 9/32* (2006.01)
(52) U.S. Cl. .......................... 713/168; 380/28; 380/29; 380/30; 380/37; 380/43; 380/44; 380/200; 380/201; 380/256; 380/260; 380/277; 380/283; 705/16; 713/171
(58) Field of Classification Search .................. 713/168
See application file for complete search history.

(56) References Cited

U.S. PATENT DOCUMENTS

| | | | |
|---|---|---|---|
| 4,218,582 A * | 8/1980 | Hellman et al. ............... 380/30 |
| 4,870,681 A | 9/1989 | Sedlak | |
| 5,136,290 A * | 8/1992 | Bond et al. .................... 341/67 |
| 5,289,542 A | 2/1994 | Kessler | |
| 5,295,188 A | 3/1994 | Wilson et al. | |
| 5,585,598 A | 12/1996 | Kasahara et al. | |
| 5,604,806 A | 2/1997 | Hassan et al. | |
| 5,737,425 A | 4/1998 | Ajtai | |
| 6,259,790 B1 | 7/2001 | Takagi et al. | |
| 6,460,137 B1 | 10/2002 | Akiyama et al. | |
| 6,578,150 B2 * | 6/2003 | Luyster ........................ 380/37 |
| 6,652,380 B1 | 11/2003 | Luciano | |

(Continued)

FOREIGN PATENT DOCUMENTS

GB 2 278 518 A 11/1994

(Continued)

OTHER PUBLICATIONS

PCT International Search Report dated Jun. 27, 2007—International Application No. PCT/US2006/005942, Filing date Feb. 21, 2006, 8 pgs.

(Continued)

*Primary Examiner*—William R Korzuch
*Assistant Examiner*—Bryan Wright
(74) *Attorney, Agent, or Firm*—Brinks Hofer Gilson & Lione

(57) ABSTRACT

The present invention is directed to a three-phase encryption method and a three-phase decryption method, and an apparatus implementing the three-phase encryption method and/or the three-phase decryption method. To encrypt a message according to the three-phase encryption method, a content of a message is converted from a first form M to a second form M'; the content of the message is separated according to a spacing pattern; and the content of the message is scrambled according to a scrambling pattern. To decrypt the message encrypted using the three-phase encryption method, the scrambling and spacing patterns are reversed, and the content of the message is converted from the second form M' to the first form M.

36 Claims, 10 Drawing Sheets

U.S. PATENT DOCUMENTS

| | | |
|---|---|---|
| 6,675,152 B1 | 1/2004 | Prasad et al. |
| 6,685,567 B2 | 2/2004 | Cockerille et al. |
| 6,721,421 B1 | 4/2004 | Schwenk et al. |
| 6,722,985 B2 | 4/2004 | Criss-Puszkiewicz et al. |
| 6,739,975 B2 | 5/2004 | Nguyen et al. |
| 6,996,233 B2 * | 2/2006 | Brokenshire et al. .......... 380/28 |
| 2002/0087884 A1 | 7/2002 | Shacham et al. |
| 2002/0141574 A1 | 10/2002 | Henson et al. |
| 2003/0076959 A1 | 4/2003 | Chui |
| 2004/0125949 A1 * | 7/2004 | Seifert ........................ 380/30 |
| 2004/0139313 A1 | 7/2004 | Buer et al. |
| 2005/0002528 A1 * | 1/2005 | Chen et al. ................. 380/255 |

FOREIGN PATENT DOCUMENTS

| | | |
|---|---|---|
| WO | WO 94/15423 | 7/1994 |
| WO | WO 98/10559 | 3/1998 |

OTHER PUBLICATIONS

Jakob Jonsson., "*An OAEP Variant With a Tight Security Proof*"—*Draft 1.0*, RSA Laboratories, Mar. 18, 2002, pp. 1-25.

* cited by examiner

SYSTEM AND METHOD FOR THREE-PHASE DATA ENCRYPTION

BACKGROUND

With the proliferation of communications networks, and in particular, communications networks implemented in whole or in part over wireless media, data security has become increasingly important. Wireless networking technologies are relatively new compared to wired networking technologies. As such, current techniques for securing wireless networks have been derived from the techniques developed for and used in wired networks. For example, one technique for securing a network, whether wired or wireless, is to encrypt the communications. This inhibits comprehension of the communications by an unauthorized party should the network be compromised. Current encryption techniques are satisfactory for direct wired network paths, which include no intermediate wireless portions. To compromise encrypted transmission, an attacker typically needs to listen to multiple transactions in order to break the encryption algorithm. For example, in order for an outside party to gain access to a transaction over direct cable connections, the outside party may gain access to the wire or to a server coupled therewith and closely monitor data streams until the outside party can determine when one transaction has been received or transmitted by the server. Alternatively, the outside party may try to access the data contained on the server, such as any secure databases stored thereon. Once accessed, and enough data is gathered, the attacker may be able decrypt the data. Techniques are known for protecting data stored on a server and the relative inaccessibility of the wired media makes accessing and intercepting wired communication inherently difficult. However, when transmitting communications wirelessly, the wireless signals carrying the communications are often broadcast omni-directionally, thereby making them accessible to anyone within range who cares to listen. Accordingly, techniques implemented to protect a transaction at the server, or over the communications media, from attacks, do little to protect transactions traveling at least partially over wireless networks, where the data cannot be protected by the server and the wireless signal cannot be securely constrained. When a transaction travels at least partially over wireless networks, anyone may attempt to intercept the data stream. This increases the probability that a given encryption algorithm will be compromised by an attacker.

In any transaction using wireless networks, one of the main concerns is the ability of an outside party to intercept a transaction and decrypt the transaction, where it has been encrypted for protection, to obtain personal and/or secure information such as credit card numbers, bank account numbers, and social security numbers. Therefore, it is desirable to protect wireless transactions to prohibit an outside party from intercepting and decrypting transactions.

BRIEF DESCRIPTION OF THE DRAWINGS

FIG. 3b is a flow chart of a scrambilization phase of the embodiment of the three-phase encryption technique of FIG. 3a;

FIG. 4b is a flow chart of a scrambilization phase of the embodiment of the three-phase encryption technique of FIG. 4a;

FIG. 8b is a flowchart of an example of a three-phase decryption technique of the embodiment of FIG. 8a.

DETAILED DESCRIPTION OF THE DRAWINGS

Figure 1:
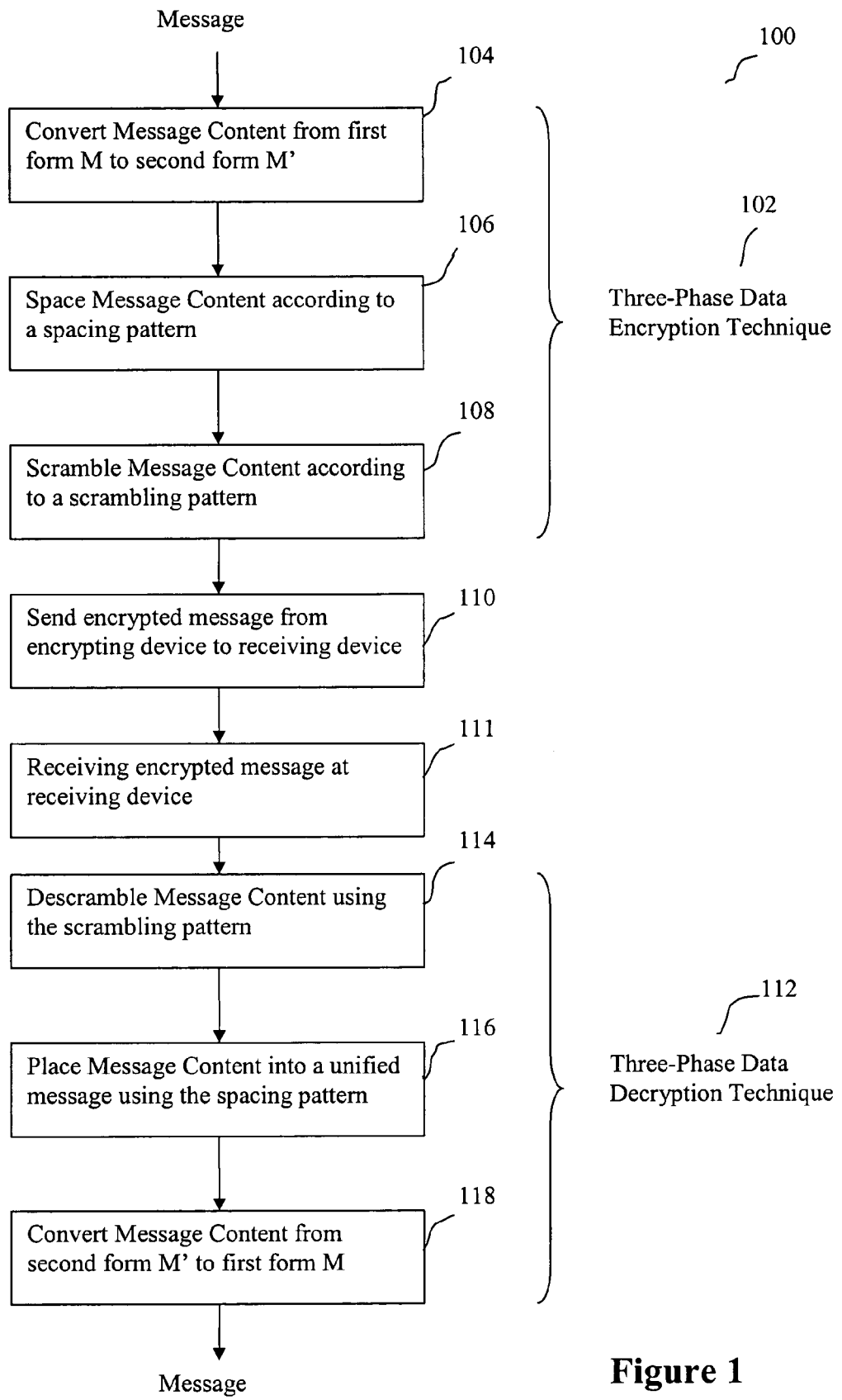
FIG. 1 is a flow chart of a three-phase encryption and decryption technique in accordance with one embodiment of the invention.

FIG. 1 is a flow chart 100 depicting one embodiment of a three-phase encryption technique and one embodiment of a three-phase decryption technique. It will be appreciated that any single device may implement either the three-phase encryption technique, the three-phase decryption technique, or combinations thereof.

Generally, the disclosed three-phase encryption and decryption techniques may be used to protect communications taking part at least partially over a wireless network. However, one of skill in the art would appreciate that the disclosed three-phase encryption and decryption techniques may be used for communications over a hardwired medium or any other type of communications medium.

The three-phase encryption technique is generally used by a transmitting device to encrypt a message before the transmitting device transmits the message to a receiving device. The transmitting device encrypts the message to prevent an outside party from easily intercepting a message traveling over a communications medium to the receiving device and gaining access to personal and/or secure information such as credit card numbers, bank account numbers, and social security number.

The three-phase decryption technique is generally used by the receiving device to decrypt the message after the receiving device receives the message from the transmitting device. The receiving device decrypts the message to gain access to the personal and/or secure information such as credit card numbers, bank account numbers, and social security number that the three-phase encryption technique protects.

In one embodiment, a sending/transmitting device, having an encryption capability encrypts a message using the disclosed three-phase encryption technique 102 and sends the message to a receiving device 110. It will be appreciated that such communications may be bi-directional and that various devices may be capable of both sending and receiving. Accordingly, the designation of sending device or receiving device used herein are contextually applied, and a sending device for one communication may be a receiving device for another communications, etc. The sending device may include a personal computer; a personal digital assistant; a server; a workstation; an appliance, e.g. smart appliance, such as a washer/dryer, refrigerator, water treatment system, or stove operative to send or receive data over a network; or any other type of network enabled device known in the art, or combinations thereof, including non-network enabled devices retrofitted or otherwise adapted to be network enabled. The receiving device receives the message 111 and decrypts the encrypted message using the disclosed three-phase decryption technique 112. Like the encrypting device, the receiving device may include a personal computer; a personal digital assistant; a server; a workstation; an appliance, e.g. smart appliance, such as a washer/dryer, refrigerator, water treatment system or stove operative to send or receive data over a network; or any other type of network enabled device known in the art, or combinations thereof, including non-network enabled devices retrofitted or otherwise adapted to be network enabled.

The wireless protocol used to send the encrypted message 110 from the encrypting device to the receiving device may include wireless fidelity ("Wi-Fi") compatible with the IEEE 802.11 standard set, such as 802.11(a), 802.11(b) or 802.11(g); general packet radio service ("GPRS"); Bluetooth, satellite or cellular transmissions; ultra wideband; WiMax; or any other type of wireless protocol using RF, light or other transmission medium, and may further include combinations of different wireless technologies over various portions of the network.

In operation of the three-phase encryption technique 102 on a message to be transmitted over the network, the content of the message is converted from a first form M to a second form M' 104, typically using prime-factorization, to hide the original content of the message during transmission.

The content of the message is then separated 106, typically into a plurality of distinct packets or a plurality of groupings, as described in detail below, to de-homogenize the intervals at which the content of the message is transmitted, thereby increasing the difficulty for a third party to listen to a transmission and decipher the message content.

In one embodiment, to separate the content of the message, the content of the message may be broken up so that a portion of the content of the message is spread throughout a plurality of distinct packets that are separated by a given amount of time when transmitted. In another embodiment, to separate the content of the message, excess characters, such as spaces, are inserted throughout the content of the message to distribute the content of the message into a plurality of groupings.

Finally, the plurality of distinct packets, or the plurality of groupings, containing the content of the message are scrambled according to a user-defined pattern 108, examples of which are described in detail below.

To decrypt a message that has been encrypted using the above described three-phase encryption technique 102, the three-phase encryption technique 102 is simply reversed 112. Typically, for increased security, the receiving device will know the necessary algorithms and variables for decrypting a message that has been encrypted using the disclosed three-phase encryption technique 102. However, in other embodiments the necessary algorithms and variables for decrypting a message may be passed to the receiving device at the cost of decreased security.

Initially, the content of the message within the plurality of distinct pulses or the plurality of groupings is descrambled 114 by reversing the user-defined pattern. Next, the plurality of packets that comprise the content of the message are reformed back into a single message, or the excess characters between the plurality of groupings are removed 116, depending upon the method that was used to break up the original message. Typically, the method used to break up the original message is indicated at the head of a message in the form of a one or two digit number. Finally, the content of the message is converted from the second form M' into the first form M 118.

Figure 2:
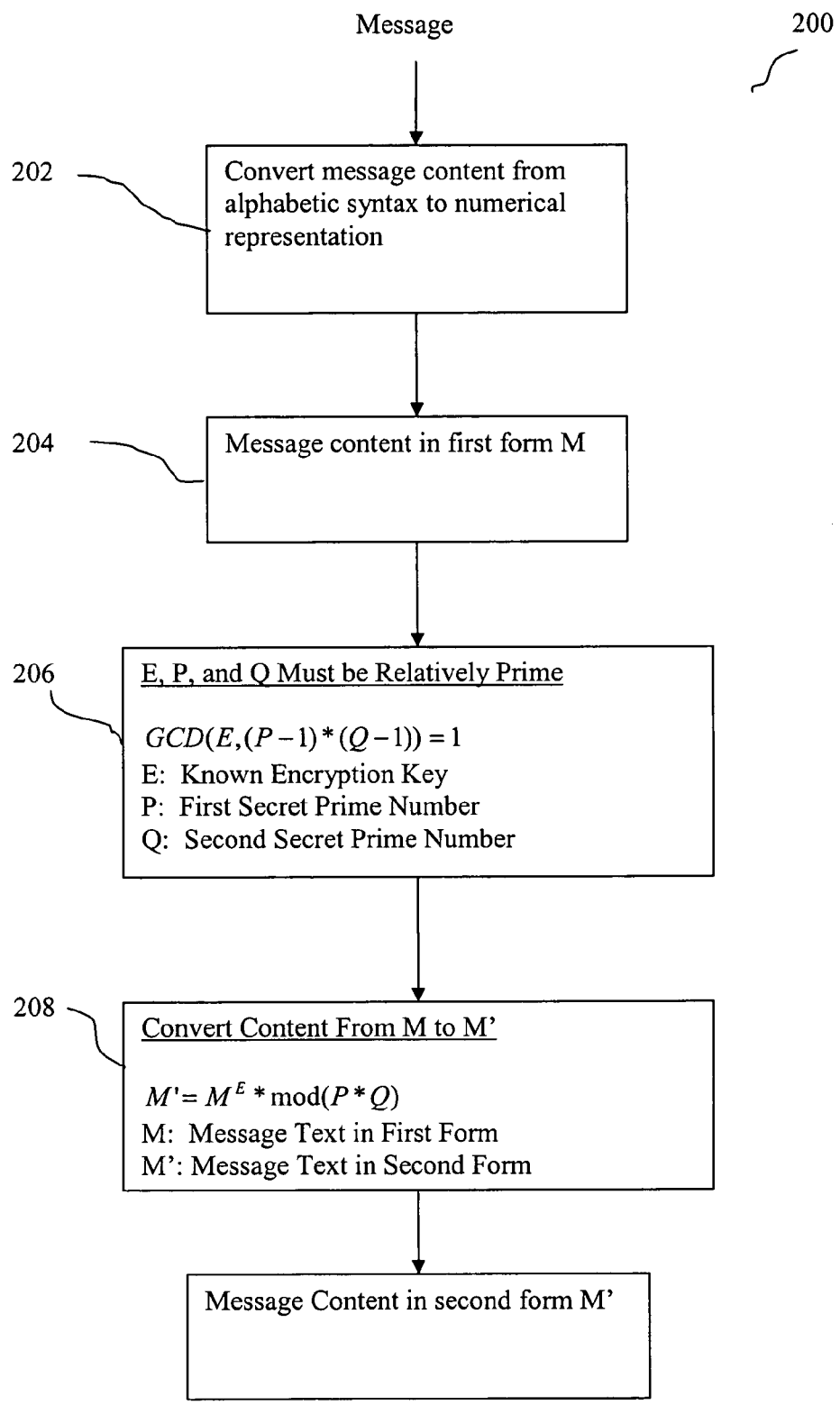
FIG. 2 is a flow chart of one embodiment of a conversion phase of the three-phase encryption technique.

FIG. 2 is a flow chart depicting one embodiment of the conversion phase 200 of the three-phase encryption technique. Typically, before the content of the message is encrypted, the alphabetical syntax of the content of the message is converted to a numerical representation 202. For example, the letter "a" may be converted to be represented numerically as 01, the letter "b" may be converted to be represented numerically as 02, and so on. The alphabetic conversions may comply with the American Standard Code for Information Interchange ("ASCII") or the Extended Binary Code Decimal Interchange Code ("EBCDIC") standards, or may be an arbitrary conversion. A function for converting alphabetical syntax into numerical representation is well known and most programming languages include a standard function to perform this type of operation.

To convert the content of the message from a first form M to a second form M', the encryption component and the decryption component of the sending device and/or receiving device are programmed with a first secret prime number P, a second secret prime number Q, a known encryption key E, and a secret encryption key D. Additionally, the product of the first and second secret prime numbers is defined to be N.

For added security, the known encryption key should be relatively prime 206 to the first and second secret prime numbers P, Q such that:

$$GCD(E,(P-1)*(Q-1))=1$$

wherein GCD is the greatest common divisor or factor. As is well known, two or more integers are defined to be relatively prime if they share no common positive factors (divisors) except the number 1.

The secret decryption key D is typically not openly known. The secret decryption key D is used to decode any message received by the receiving device. After choosing the first secret prime number P, the second secret prime number Q, and the known encryption key E, the secret encryption key D may be calculated using the formula:

$$D*E=1*\mathrm{mod}((P-1)*(Q-1)).$$

Using the product N of the first secret prime number P and the second secret prime number Q, and the known encryption key E, the content of the message is converted 208 from a first form M to a second form M' according to the formula:

$$M'=M^E \bmod N.$$

Note that for the conversion 208 from the first form M to the second form M' to work correctly, the numerical value of N must be greater than the numerical value of the content of the message in the first form M.

Figure 3A:
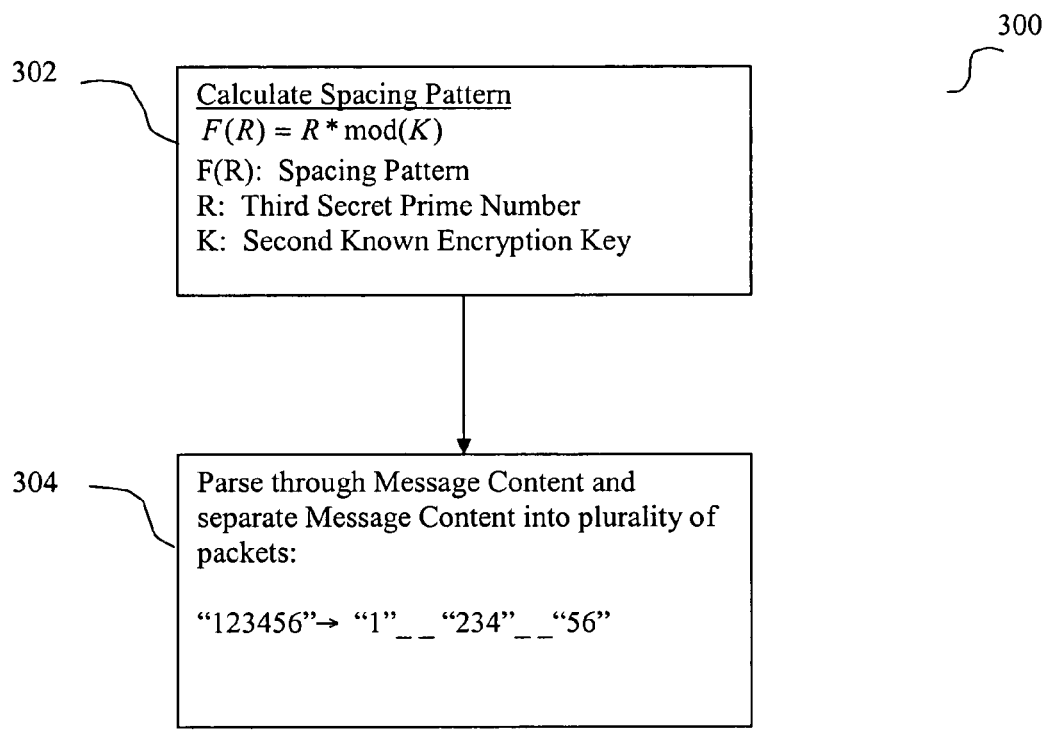
FIG. 3a is a flow chart of one embodiment of a separating phase of the three-phase encryption technique.
Figure 4A:
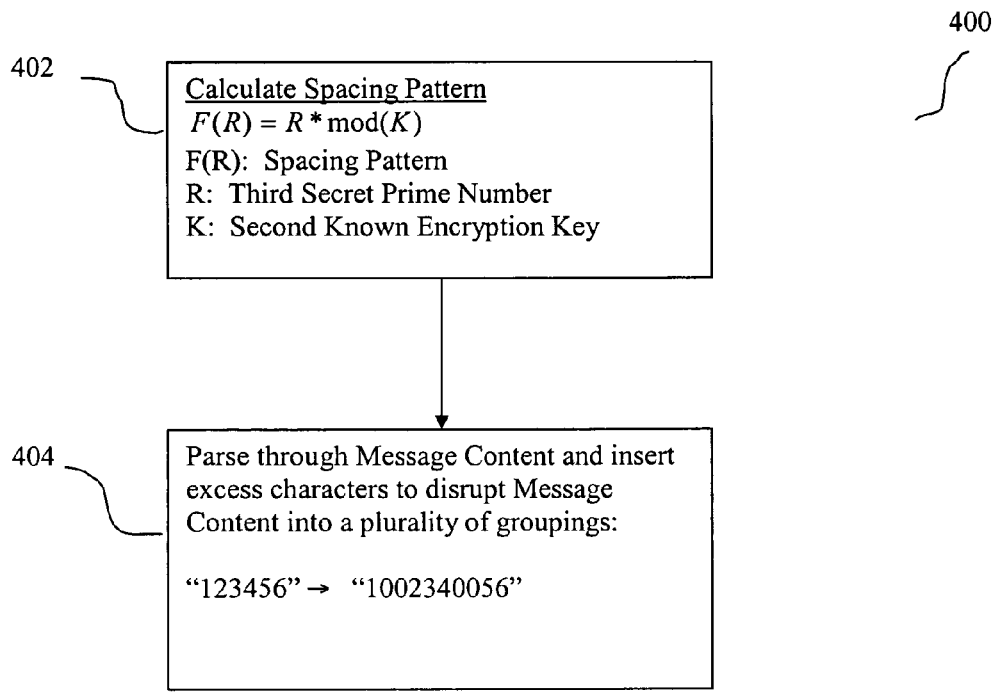
FIG. 4a is a flow chart of another embodiment of a separating phase of the three-phase encryption technique.

FIGS. 3a and 4a are flow charts for the separating phase of the three-phase encryption technique. Typically the content of the message is separated after the conversion phase, but in other embodiments, the content of the message could be separated before the conversion phase.

In one embodiment shown in FIG. 3a, to separate the content of the message, the content of the message is broken up 300 so that the content of the message is spread throughout a plurality of distinct packets 304. Typically, to determine a spacing pattern for the plurality of distinct packets, a third secret prime number R and a second known encryption key K are chosen. The value of the openly known encryption key K may be any modulus such as 10, the value of the secret encryption key D, or any other recommended value.

In one embodiment, the spacing pattern may be a number of characters that the encrypting device waits between the plurality of distinct packets. However, in other embodiments, a user may choose to have the value of the spacing pattern correspond to other meanings with respect to the spacing between the plurality of distinct packets. The spacing pattern is typically calculated 302 according to the formula:

$$F(R)=R*\mathrm{mod}(K).$$

In some embodiments, the spacing pattern may alternate between "R mod K" and "K−R mod K," or any other formula chosen by a user.

In another embodiment shown in FIG. 4a, to separate the content of the message 400, the content of the message is spaced so that excess characters are inserted throughout the content of the message 404 to distribute the content of the message into a plurality of groupings. The excess characters may be spaces or any other type of characters desired by the user. The spacing pattern for the number of excess characters may be determined according to the same process described above for determining the spacing pattern in the embodiment of FIG. 3a. Typically, a third secret prime number R and a second known encryption key K are chosen. The value of the second known encryption key K may be any modulus such as 10, the value of the secret encryption key D, or any other recommended value. The spacing pattern may be calculated 402 according to the formula:

$$F(R)=R*\mathrm{mod}(K).$$

In some embodiments, the spacing pattern may alternate between "R mod K" and "K−R mod K," or any other formula chosen by a user.

Typically, after the spacing phase 300, 400, the sections of the content of the message remaining are scrambled 306, 406. However, in other embodiments, the order of the three-phase encryption technique may be changed such that the content of the message is scrambled 306, 406 before the spacing phase 300, 400 or the conversion phase 200.

Figure 3B:
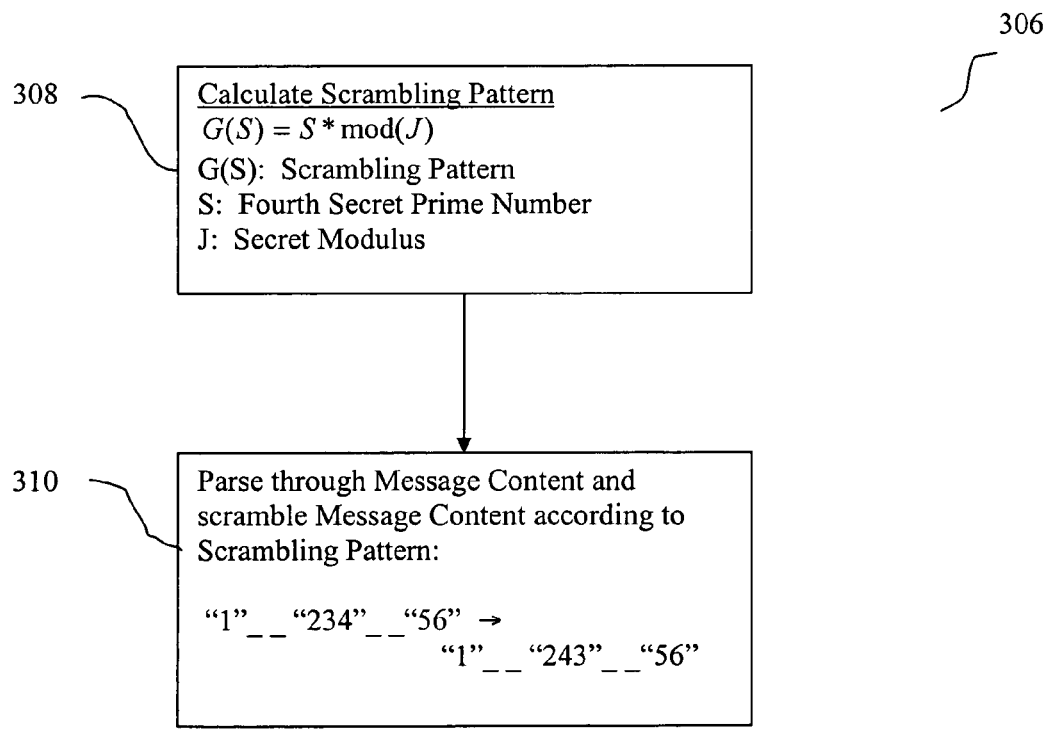

FIG. 3b is a flow chart for the scrambling phase 306 of the three-phase data encryption method of the embodiment of FIG. 3a. Typically, a fourth prime number S and a secret modulus J are chosen. The value of the secret modulus J may be any integer such as 10, one of the secret encryption keys, or a set of secret whole numbers. The fourth prime number S and the secret modulus J are used to calculate 308 a scrambilization pattern according to the formula:

$$G(S)=S*\mathrm{mod}(J).$$

In one embodiment, the scrambilization pattern may represent which of the plurality of distinct packets will be scrambled according to a predefined method. For example, if the scrambilization pattern were to equal the number 2, this may represent a scrambling action taking place on every other distinct packet. The scrambling action may include reversing two numerical characters, adding a constant to a numerical message value, or any other function desired by a user 310.

Figure 4B:
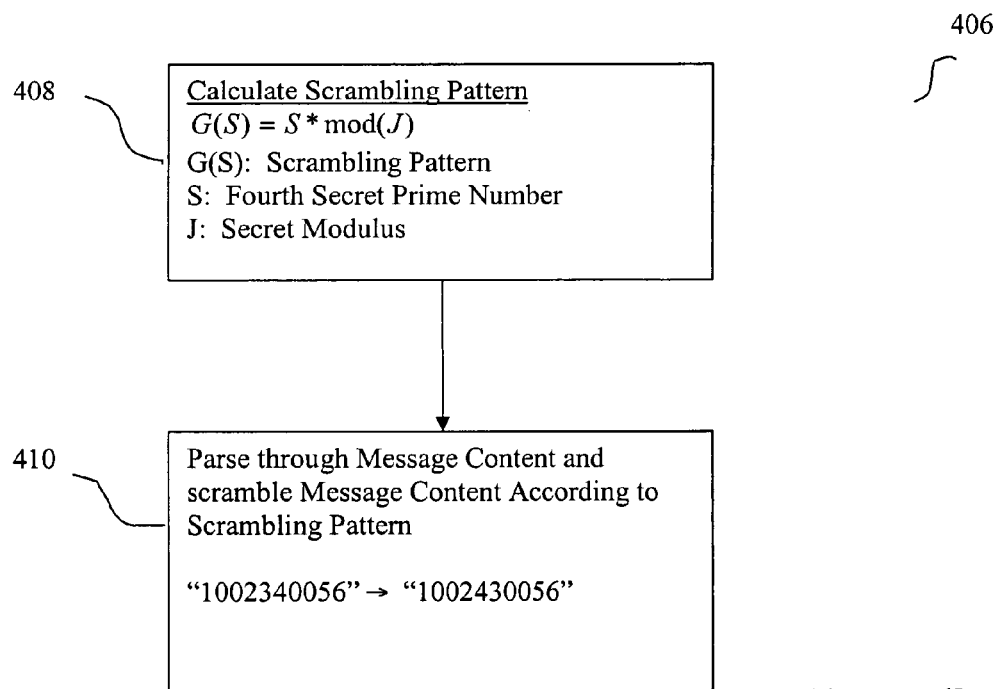

FIG. 4b is a flow chart for the scrambling phase 406 of the embodiment of FIG. 4a. As described above for the embodiment of FIGS. 3a and 3b, a fourth prime number S and a secret modulus J are chosen. The prime number S and secret modulus J are used to calculate 408 a scrambilization pattern according to the formula:

$$G(S)=S*\mathrm{mod}(J).$$

Figure 5:
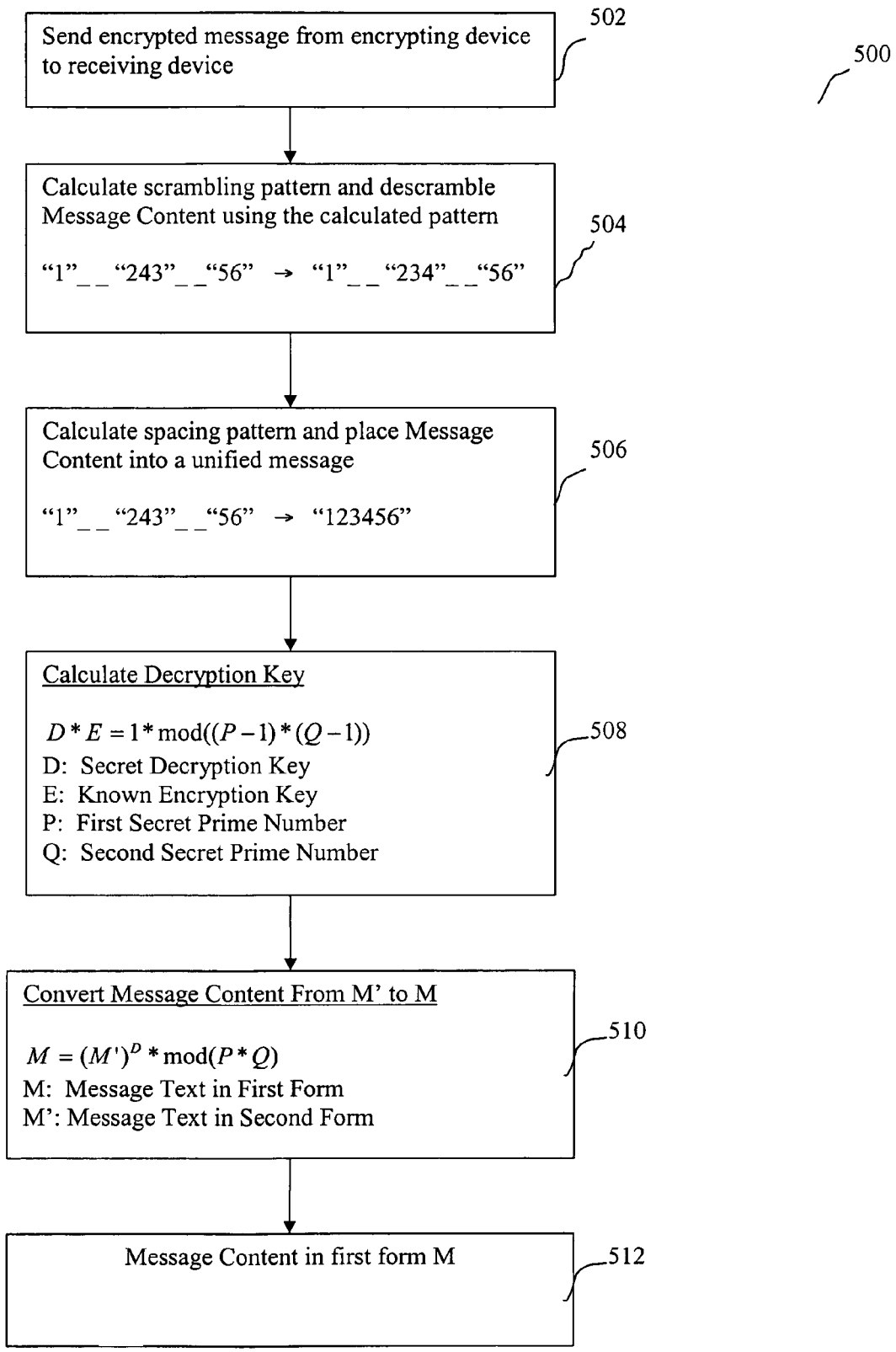
FIG. 5 is a flow chart of a three-phase decryption technique of the embodiment of the three-phase encryption technique of FIGS. 3a and 3b.

FIG. 5 is a flowchart of the decryption 500 of an encrypted message created according to the embodiment of FIGS. 3a and 3b. After the encrypting device has processed the message through the three-phase encryption technique, the encrypted message may be sent to a receiving device 502. Once received, the receiving device reverses the three-phase encryption technique to decrypt the encrypted message.

Typically, the content of the message within the plurality of distinct packets is descrambled 504 by simply reversing the process described in FIG. 3b above. Typically, the receiving device will know the secret modulus J and the fourth prime number S to be able to calculate the scrambilization pattern and parse through the encrypted content of the message to reverse the scrambilization 504.

After the descrambling phase 504, the plurality of distinct packets that comprise the message are reformed backing into a single message 506. Typically, the receiving device will know the third secret prime number R and the second known encryption key K so that the receiving device may calculate the spacing pattern and parse through the message to reverse the process described in FIG. 3a above 506.

After the plurality of distinct packets is reformed into a single message 506, the content of the message is converted from the second form M' to the first form M 510. Typically, the receiving device will know the openly known encryption Key E and the first and second secret prime numbers P, Q. Using E, P, and Q, the receiving device calculates 508 the secret decryption key D using the formula:

$$D*E=1*\mathrm{mod}((P-1)*(Q-1)).$$

The receiving device then converts 510 the content of the message from the second form M' to the first form M according to the formula:

$$M=(M')^{D}*\mathrm{mod}(P*Q).$$

Figure 6:
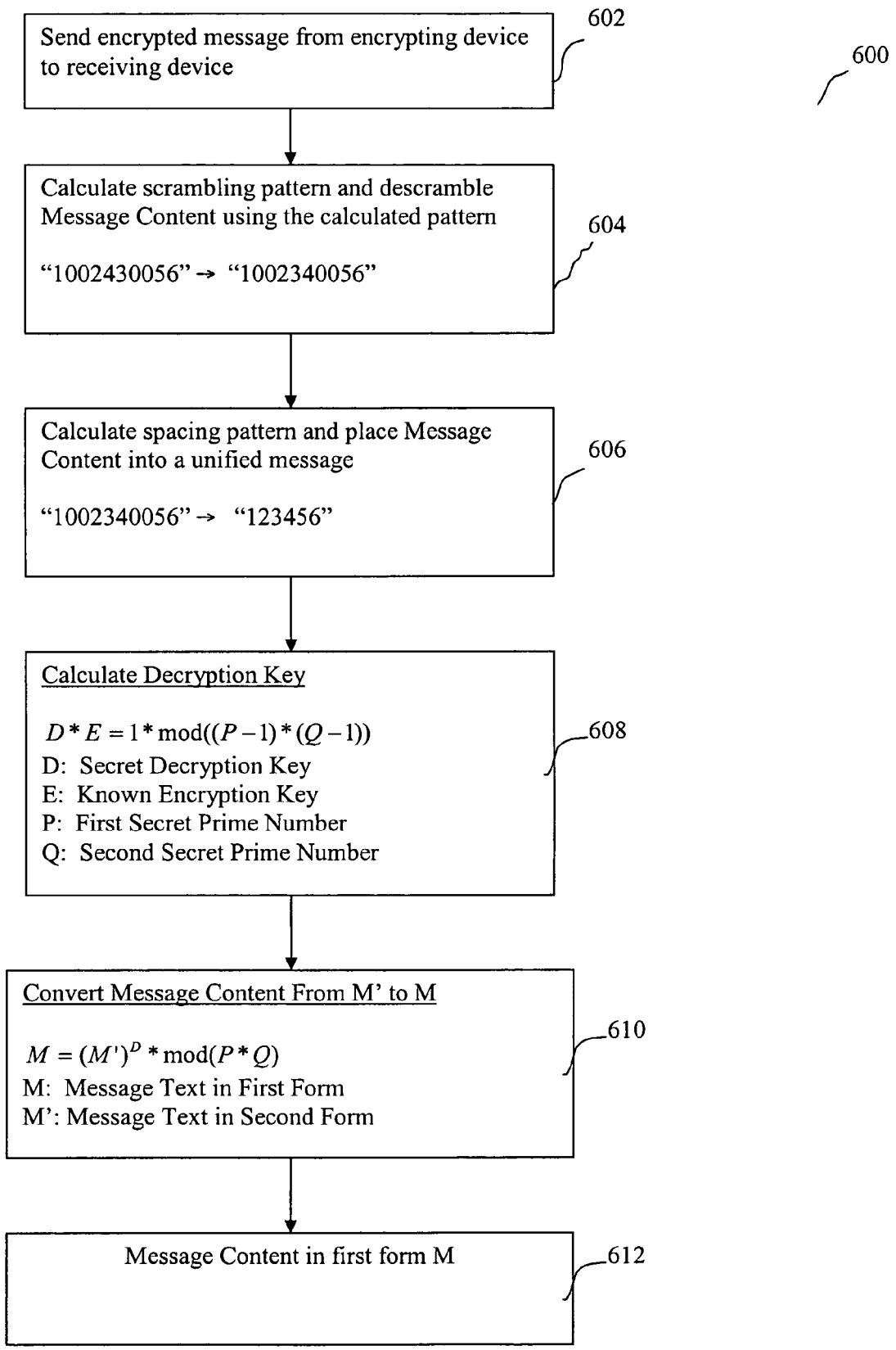
FIG. 6 is a flow chart of a three-phase decryption technique of the embodiment of the three-phase encryption technique of FIGS. 4a and 4b.

FIG. 6 is a flowchart of the decryption 600 of an encrypted message received from an encrypting device 602 in accordance with the embodiment of FIGS. 4a and 4b. Typically, the content of the message distributed by excess characters is descrambled 604 by simply reversing the process described in FIG. 4b above. Typically, the receiving device will know the secret modulus J and the fourth prime number S to be able to calculate the scrambling pattern and parse through the message to reverse the scrambling process.

After the descrambilization phase 604, the plurality of distinct packets that comprise the message are reformed 606 back into a single message. Typically, the receiving device will know the prime number R and the second known encryption key K to be able to calculate the spacing pattern and parse through the message to reverse the separating process described in FIG. 4a above.

After the plurality of distinct packets is reformed 606 into a single message, the content of the message is converted 610 from the second form M' to the first form M. Typically, the receiving device will know the known encryption key E, the first secret prime number P, and the second secret prime number Q. Using E, P, and Q, the receiving device calculates 608 the secret decryption key D using the formula:

$$D*E=1*\mathrm{mod}((P-1)*(Q-1)).$$

The receiving device then converts 610 the content of the message from the second form M' into the first form M according to the formula:

$$M=(M)D*\mathrm{mod}(P*Q).$$

As with the order of the phases in the encryption process, the order of the phases in the decryption process may be reversed in other embodiments.

Figure 7:
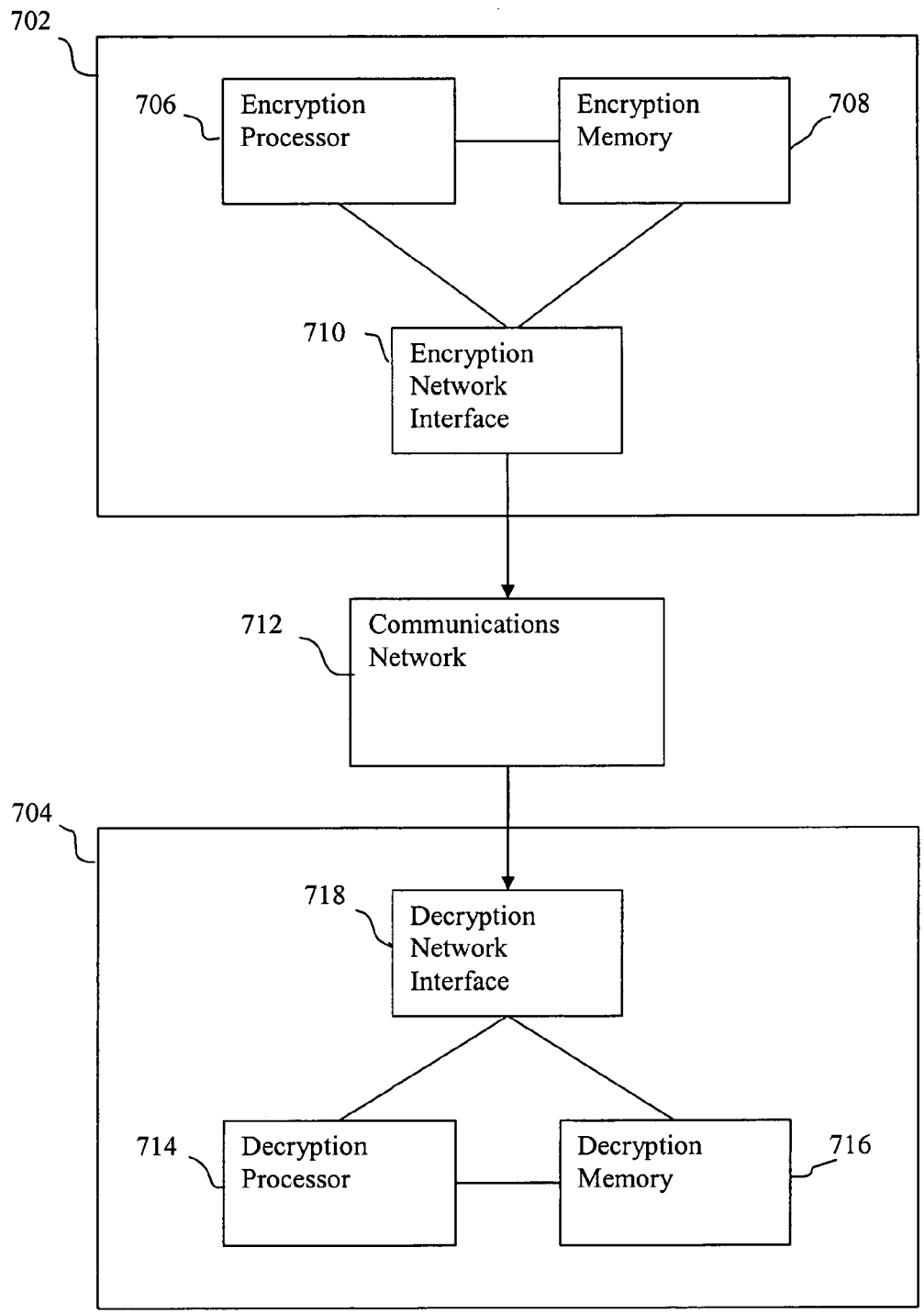
FIG. 7 is a block diagram of one embodiment of an encryption module and one embodiment of a decryption module.

FIG. 7 is a block diagram showing one embodiment of an encryption module 702 for encrypting a message using the three-phase encryption technique and one embodiment of a decryption module 704 for decrypting a message using a three-phase decryption technique. The encryption and decryption modules 702, 704 may be any type of hardware or software capable of performing the three-phase encryption and decryption techniques. A single device may comprise both the encryption and decryption modules 702, 704 so that the single device is capable of bi-directional communication, or the single device may comprise either the encryption or decryption module 702, 704 so that the single device is capable of communication in only one direction.

The encryption module 702 typically includes an encryption processor 706, an encryption memory 708 coupled with the encryption processor 706, and an encryption network interface 710 coupled with the encryption processor 706, encryption memory 708, and a communications network 712. Herein, the phrase "coupled with" is defined to mean directly connected to or indirectly connected through one or more intermediate components. Such intermediate components may include both hardware and software based components.

The encryption processor 706 may be a standard Pentium processor, an Intel embedded processor, a custom processor; or any other type of processor hardwired, or capable of running software programs, to execute the functions described above of converting the content of a message from a first form M to a second form M', separating the content of the message according to a spacing pattern, and scrambling the content of the message according to the scrambilization pattern. Typically, these functions will be implemented as logic in software programs, stored in the encryption memory 708, and executable by the encryption processor 706.

The encryption memory 708 may be any type of memory such as ROM or flash memory, or may be any type of permanent or removable disk or drive. The encryption network interface 710 may be any type of network interface capable of communications over a wireless network, a hardwired communication network, or any other type of communications medium.

Similarly, the decryption module 704 also typically includes a decryption processor 714, a decryption memory 716 coupled with the decryption processor 714, and a decryption network interface 718 coupled with the decryption processor 714, decryption memory 716, and the communications network 712.

The decryption processor 714 may be a standard Pentium processor, an Intel embedded processor, a custom processor; or any other type of processor hardwired, or capable of running software programs, to execute the functions described above of descrambling the content of a message according to the scrambling pattern, unifying the separated content of the message according to a spacing pattern, and converting the content of the message form the second form M' to the first form M. Typically, these functions will be implemented as logic in software programs, stored in the decryption memory 716, and executable by the decryption processor 714. The decryption memory 716 may be any type of memory such as ROM or flash memory, or may be any type of permanent or removable disk or drive.

The decryption memory 716 may be any type of memory such as ROM or flash memory, or may be any type of permanent or removable disk or drive. The decryption network interface 718 may be any type of network interface capable of communications over a wireless network, a hardwired communication network, or any other type of communications medium.

Figure 8A:
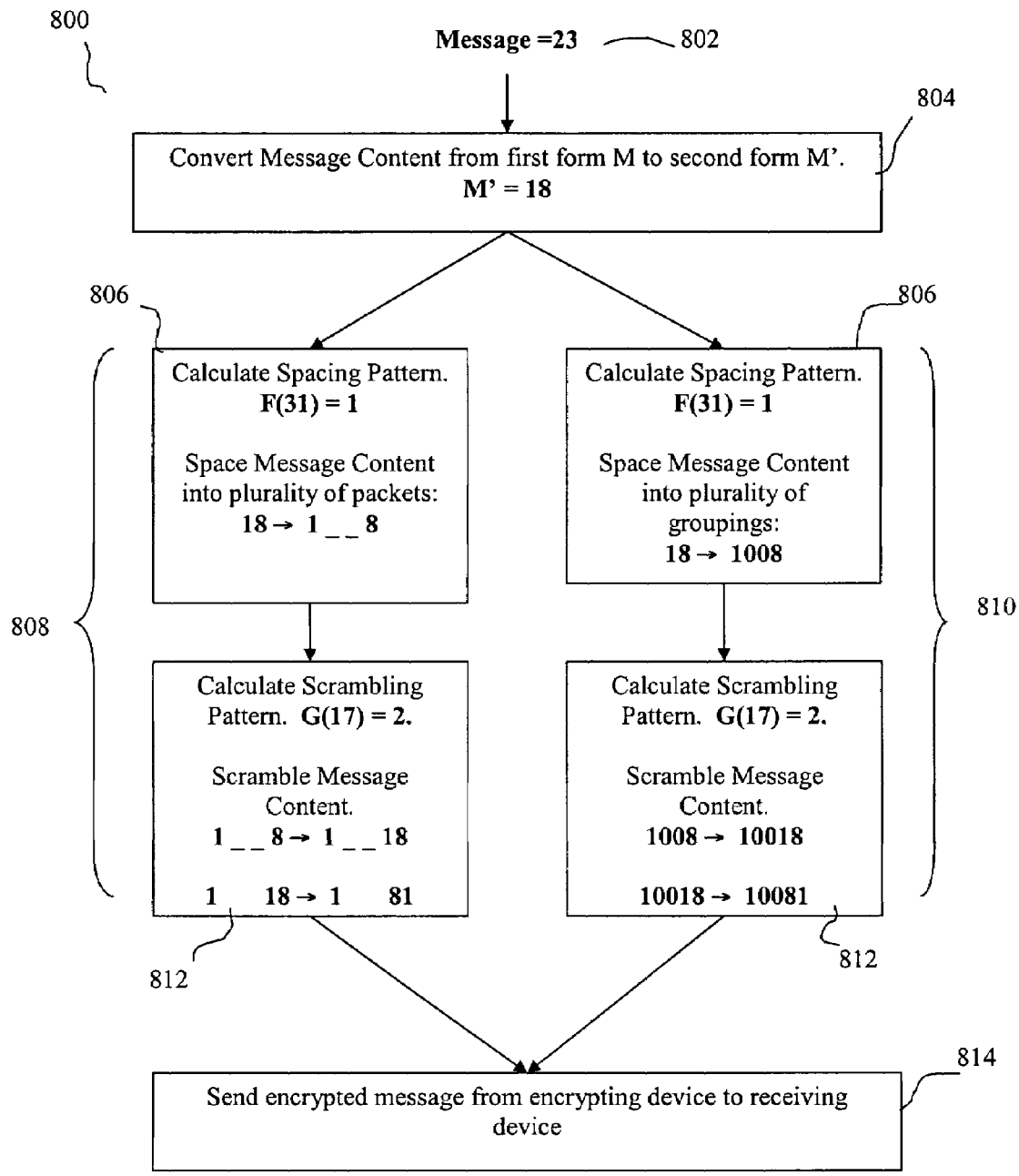
FIG. 8a is a flowchart of an example of an embodiment of a three-phase encryption technique.
Figure 8B:
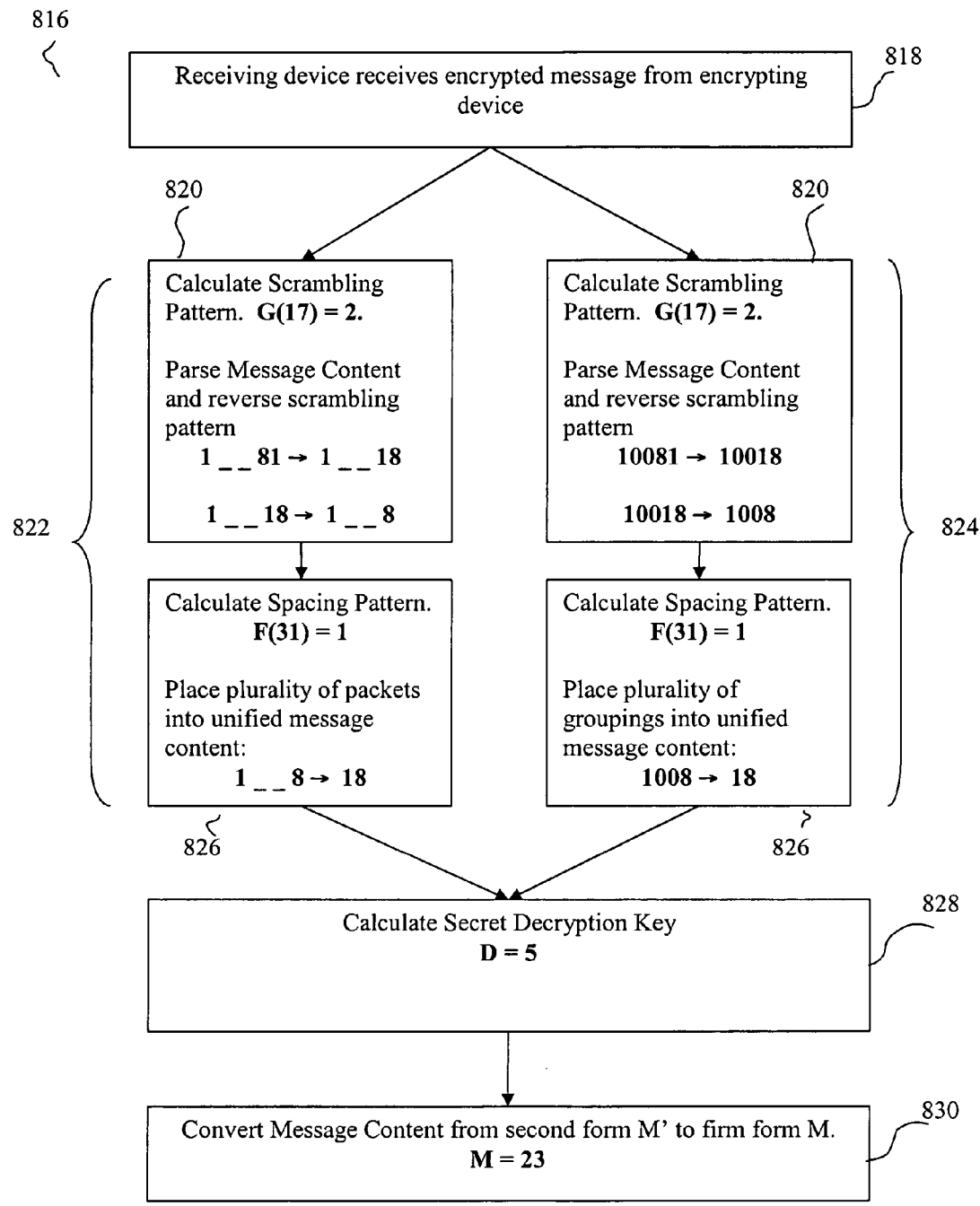

FIGS. 8a and 8b are flowcharts showing an example of a message encrypted (FIG. 8a) and then decrypted (FIG. 8b) using one embodiment of a three-phase data encryption method. As seen in FIG. 8a, the message in the first form M is defined to have a value of 23 802. Further, the first secret prime number is defined to have a value of 5, the second secret prime number is defined to have a value of 7, and the known encryption key E is defined to have a value of 29. As explained above, the value of the first and second secret prime numbers are prime and the known encryption key E is relatively prime to the first and second secret prime numbers. Furthermore, the product of the first and second prime number is calculated to be 35, meeting the requirement that the product of the first and second prime numbers be greater than the value of the message in the first form M.

The message is converted 804 from the first form M to the second form M' as described above, according to the formula:

$$M'=M^{E}*\mathrm{mod}(P*Q)$$

$$M'=(23)^{29}*\mathrm{mod}(35).$$

When the conversion phase 804 is performed, the message value in the first form M of 23 is calculated to have a value of 18 in the second form M'.

After the conversion phase 804, the spacing phase 806 is performed. In the example, the third secret prime is defined as 31 and the second known encryption key is defined as 10. A spacing pattern is calculated 806 as described above according to the formula:

$$F(R)=R*\mathrm{mod}(K)$$

$$F(31)=31*\mathrm{mod}(10),$$

resulting in a value of 1. In the example, the value of 1 is defined to be a single space, "00".

In the embodiment where the message is separated into distinct packets 808, a value of 1 results in the message separated from "18" to a value of "1___8" with a single space between the distinct packets. Alternatively, in the embodiment where excess spaces are placed between the plurality of groups to distribute the message 810, the message is separated from "18" to a value of "1008" with two excess characters, defined to be a space, between the plurality of groupings.

After the spacing phase 806, the scrambilization pattern is calculated 812. In the example, the fourth prime number is defined to be 17 and the secret modulus is defined to be 15. A scrambilization pattern is calculated according to the formula:

$$G(S)=S*\mathrm{mod}(J)$$

$$G(17)=17*\mathrm{mod}(15),$$

resulting in a value of 2. In the example, the value of 2 is defined to mean that every other packet or grouping is scrambled.

In the example, when a grouping or packet is scrambled, it has been defined to mean a constant of 10 is added to the numerical value and the two numerical characters are reversed. In the embodiment where the message is separated into distinct packets 808, the message of "1___8" is first changed to "1___18" and then to "1___81". Therefore, the message value of 23 has an encrypted value of "1___81".

In the embodiment where excess spaces are placed between the groups to distribute the message 810, the message of "1008" is first changed to "10018" and then to "10081". Therefore, the message value of 23 has an encrypted value of 10081.

The encrypting device may then send the encrypted value of 10081 to the receiving device 814. Referring to FIG. 8*b*, the receiving device receives this encrypted message 818 and may first descramble the content of the message 820. The receiving device must know that each grouping or packet that is scrambled must have the two numerical characters reversed and an added value of 10 to the original message. Additionally, the receiving device must know the fourth prime number is defined to be 17 and the secret modulus is defined to be 15 so that the receiving device can correctly calculate that the value of the scrambling pattern is 2 as described above.

In the embodiment where the message is separated into distinct packets 822, the message of "1___81" is first changed to "1___18" and then to "1___8" 820. In the embodiment where excess spaces are placed between the plurality of groups to distribute the message 824, the message of "10081" is first changed to "10018" and then to "1008" 820.

After the descrambling phase 820, the receiving device places the message back into a unified message 826. The receiving device must know that the third secret prime is defined as 31 and the openly known modulus is defined as 10 so that the receiving device may correctly calculate a spacing pattern of 1 and know than one space, or "00," has been inserted between the groupings or packets of the content of the message.

In the embodiment where the message is separated into distinct packets 822, the message of "1___8" is changed to "18". Further, in the embodiment where excess spaces are placed between the plurality of groups to distribute the message 824, the message of "1008" is changed to "18".

Finally, the receiving device performs the conversion phase 830 to convert the content of the message form the second form M' back into the first form M. The receiving device must know that the first secret prime number is defined to have a value of 5, the second secret prime number is defined to have a value of 7, and the known encryption key E is defined to have a value of 29. Using these values, the receiving device calculates 828 the secret decryption key D as described above according to the formula:

$$D*E=1*\mod((P-1)*(Q-1))$$

$$D*29=1*\mod(4*6),$$

resulting in a value of 5. Using the secret decryption key D, the receiving device converts 830 the message in the second form M' to the first form M according to the formula:

$$M=(M')^{D}*\mod(P*Q)$$

$$M=(18)^{5}*\mod(7*5).$$

The above formula results 830 in a value of the message in the first form M of 23, the same as the value of the message in the first form before the three-phase encryption process is performed.

Figure 9:
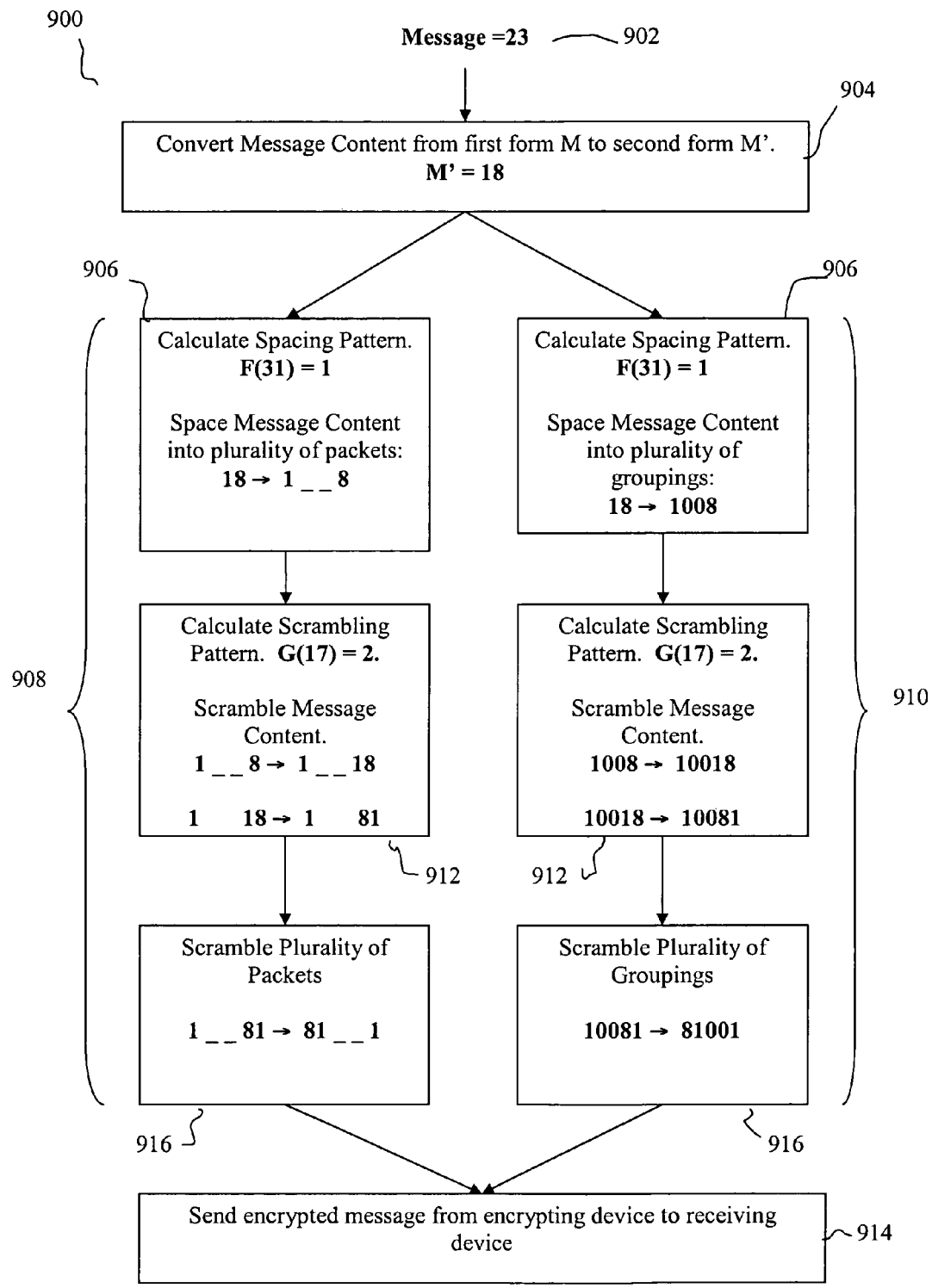
FIG. 9 is a flowchart of an example of an embodiment of a three-phase encryption technique with an additional fourth phase.

Devices implementing the three-phase encryption technique or the three-phase decryption technique may also integrate additional phases into the three-phase encryption technique or the three-phase decryption technique. For example as seen in FIG. 9, in one embodiment, a device implementing the three-phase decryption technique of FIG. 8*a* may perform a fourth phase 916 of scrambling the order of the plurality of packets or the plurality of groupings. Thus, any additional phase may be added to the three-phase encryption technique or the three-phase decryption technique so long as the new phase does not distort the data to an extent that the new phase cannot be accurately reversed.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for encrypting a message comprising:
    converting, with a processor, a content of the message from a first form M to a second form M' as a function of a known encryption key E, a first secret prime number P, and a second secret prime number Q;
    after converting the content of the message to the second form M' as a function of a known encryption key E, a first secret prime number P, and a second secret prime number Q, separating, with a processor, the converted content of the message to further encrypt the content of the message according to a spacing pattern; and
    after converting the content of the message to the second form M' as a function of a known encryption key E, a first secret prime number P, and a second secret prime number Q, scrambling, with a processor, the converted content of the message to further encrypt the content of the message according to a scrambling pattern.

2. The computer-implemented method of claim 1, further comprising:
    converting the content of the message from alphabetical syntax into numerical representation.

3. The computer-implemented method of claim 2, wherein the content of the message is converted from alphabetical syntax into numerical representation using a hash function.

4. The computer-implemented method of claim 1, wherein the known encryption key is relatively prime to the first secret prime number and the second secret prime number.

5. The computer-implemented method of claim 4, wherein the content of the message is converted from the first form M to a second form M' according to the formula:

$$M'=M^{E}\mod(P*Q).$$

6. The computer-implemented method of claim 1, wherein the spacing pattern for separating the content of the message is a function of a third secret prime number R and a modulus K, according to the formula:

$$F(R)=R*\mod(K).$$

7. The computer-implemented method of claim 6, wherein the phase of separating the content of the message according to a spacing pattern comprises: pulsing the content of the message into a plurality of distinct packets.

8. The computer-implemented method of claim 6, wherein the phase of separating the content of the message according to a spacing pattern comprises: inserting excess characters into the content of the message to distribute the content of the message into a plurality of groupings.

9. The computer-implemented method of claim 8 wherein the excess characters are spaces.

10. The computer-implemented method of claim 1 wherein the scrambling pattern is a function of a secrete modulus J and a fourth secret prime number S, according to the formula:

$$G(S)=S*\mod(J).$$

11. The computer-implemented method of claim 1, further comprising:
    after converting the content of the message, separating the content of the message, and scrambling the content of the message, sending an encrypted message to a receiving device.

12. The computer-implemented method of claim 11, further comprising: receiving the encrypted message at the receiving device;
   descrambling the content of the message;
   placing the separated content of the message into a unified message;
   and converting the content of the message from the second form M' back into the first form M.

13. The computer-implemented method of claim 12, wherein the phase of descrambling the content of the message comprises:
   calculating the scrambling pattern for the content of the message using a fourth secret prime number and a secret modulus; and
   parsing through the encrypted message and reversing the scrambling pattern.

14. The computer-implemented method of claim 12, wherein the phase of placing the separated content of the message into a unified message comprises:
   calculating a spacing pattern for the content of the message using a third secret prime number R and a second known encryption key K; and
   parsing through the separated message to reverse the spacing pattern.

15. The computer-implemented method of claim 12, wherein the phase of converting the content of the message from the second form M' back into the first form M comprises:
   calculating a secret decryption key D as a function of the known encryption key E, first secret prime number P, and second secret prime number Q according to the formula:

$D*E = I* \mod((P-I)*(Q-I))$;

and using the secret calculated decryption key D to convert the content of the message in the second form M' back into the first form M' according to the formula:

$M = (M')^D * \mod(P*Q)$.

16. A computer implemented encryption and decryption method comprising:
   converting, with a processor, a content of a message from a first form M to a second form M' as a function of a known encryption key E, a first secret prime number P, and a second secret prime number Q;
   after converting the content of the message to the second form M' as a function of a known encryption key E, a first secret prime number P, and a second secret prime number Q, separating, with a processor, the converted content of the message to further encrypt the content of the message according to a spacing pattern, the spacing pattern a function of a third secret prime number R and a second known encryption key K;
   after converting the content of the message to the second form M' as a function of a known encryption key E, a first secret prime number P, and a second secret prime number Q, scrambling, with a processor, the converted content of the message according to a scrambling pattern, the scrambling pattern a function of a fourth secret prime number S and a secret modulus J;
   sending, with a processor, an encrypted message from an encrypting device to a receiving device
   calculating, with a processor, the scrambling pattern and parsing through the encrypted message to reverse the scrambling pattern;
   calculating, with a Processor, the spacing pattern and parsing through the encrypted message to place the content of the message in a unified message; and
   converting, with a processor, the content of the message from the second form M' to the first form M as a function of a decryption key D, the first secret prime number P, and the second secret prime number Q.

17. The computer implemented encryption and decryption method of claim 16, wherein the product of the first secret prime number P and the second secret prime number Q is greater than the numerical value of the content of the message in the first form M.

18. The computer implemented encryption and decryption method of claim 17, wherein the known encryption key E is relatively prime to the first secret prime number P and the second secret prime number Q.

19. The computer implemented encryption and decryption method of claim 18, wherein the content of the message is converted from the first form M to the second form M' according to the formula:

$M' = M^E * \mod(P*Q)$.

20. The computer implemented encryption and decryption method of claim 16, wherein the spacing pattern is calculated according to the formula:

$F(R) = R* \mod(K)$.

21. The computer implemented encryption and decryption method of claim 16, wherein the scrambling pattern is calculated according to the formula:

$G(S) = S* \mod(J)$.

22. The computer implemented encryption and decryption method of claim 16, wherein the decryption key is calculated according to the formula:

$D*E = I* \mod((P-I)*(Q-I))$.

23. The computer implemented encryption and decryption method of claim 22, wherein the content of the message is converted from the second form M' to the first form M according to the formula:

$M = (M')^D * \mod(P*Q)$.

24. A system for encrypting a message, comprising:
   an encryption module comprising a first processor, a first memory coupled with the first processor, and a first network interface coupled with a communications network, the first processor, and the first memory;
   conversion logic stored in the first memory and executable by the first processor to convert a content of the message from a first form M to a second form M' as a function of a known encryption key E, a first secret prime number P, nd a secret prime number Q;
   separating logic stored in the first memory and executable by the first processor to separate the content of the message according to a spacing pattern to further encrypt the content of the message after the content of the message is converted to the second form M' as a function of a known encryption key E, a first secret prime number P, and a secret prime number Q;
   scrambling logic stored in the first memory and executable by the first processor to scramble the content of the message according to a scrambling pattern to further encrypt the content of the message after the content of the message is converted to the second form M' as a function of a known encryption key E, a first secret prime number P, and a secret prime number Q; and
   communication logic stored in the first memory and executable by the first processor to send an encrypted message over the communications network.

25. The system of claim 24, wherein the content of the message is converted from the first form M to a second form M' according to the formula:

$$M'=M^E \bmod(P*e).$$

26. The system of claim 24, wherein the spacing pattern for separating the content of the message is a function of a third secret prime number R and a modulus K, according to the formula:

$$F(R)=R*\bmod(K).$$

27. The system of claim 26, wherein the phase of separating the content of the message according to a spacing pattern comprises:
pulsing the content of the message into a plurality of distinct packets.

28. The system of claim 26, wherein the phase of separating the content of the message according to a spacing pattern comprises:
inserting excess characters into the content of the message to distribute the content of the message into a plurality of groupings.

29. The system of claim 24 wherein the scrambling pattern is a function of a secrete modulus J and a fourth secret prime number S, according to the formula:

$$G(S)=S*\bmod(J).$$

30. The system of claim 24, further comprising:
a decryption module comprising a second processor, a second memory coupled with the second processor, and a second network interface coupled with the communications network, the second processor, and the second memory;
a second communications logic stored in the second memory and executable by the second processor to receive the encrypted message over the communications network;
descrambling logic stored in the second memory and executable by the second processor to descramble the content of the message;
unifying logic stored in the second memory and executable by the second processor to place the separated content of the message into a unified message; and second conversion logic stored in the second memory and executable by the second processor to convert the content of the message from the second form M' back into the first form M.

31. The system of claim 30 wherein the second conversion logic calculates a secret decryption key D as a function of the known encryption key E, first secret prime number P, and second secret prime number Q according to the formula:

$$D*E=I*\bmod((P-I)*(Q-I)); \text{ and}$$

using the secret calculated decryption key D, converts the content of the message in the second form M' back into the first form M according to the formula:

$$M=(M')^D*\bmod(P*Q).$$

32. A system for encrypting and decrypting a message comprising:
conversion means for converting a content of the message from a first form M to a second form M' as a function of a known encryption key E, a first secret prime number P, and a second secret prime number Q;
separating means for separating the content of the message according to a spacing pattern to further encrypt the content of the message after the content of the message is converted to the second form M' as a function of a known encryption key E, a first secret prime number P, and a second secret prime number Q, the spacing pattern a function of a third secret prime number R and a second known encryption key K;
scrambling means for scrambling the content of the message according to a scrambling pattern to further encrypt the content of the message after the content of the message is converted to the second form M' as a function of a known encryption key E, a first secret prime number P, and a second secret prime number Q, the scrambling pattern a function of a fourth secret prime number S and a secret modulus J;
descrambling means for calculating the scrambling pattern and parsing through the encrypted message to reverse the scrambling pattern;
unifying means for calculating the spacing pattern and parsing through the encrypted message to place the content of the message into a unified message; and
second conversion means for converting the content of the message from the second form M' to the first form M as a function of a decryption key D, the first secret prime number P, and the second secret prime number Q.

33. A system for decrypting a message, comprising:
a decryption module comprising a processor, a memory coupled with the processor, and a network interface coupled with a communications network, the processor, and the memory;
communications logic stored in the memory and executable by the processor to receive an encrypted message over the communications network;
descrambling logic stored in the memory and executable by the processor to descramble a content of the message that has been encrypted based on a scrambling pattern using the scrambling pattern;
unifying logic stored in the memory and executable by the processor to place separated content of the message that has been encrypted based on a spacing pattern into a unified message using the spacing pattern; and
conversion logic stored in the memory and executable by the processor to convert the content of the message from a second form M' back into a first form M based on a known encryption key E, a first secret prime number P, and a second secret prime number Q after the content of the message is descrambled nd the content of the message is placed into a unified message.

34. The system of claim 33, wherein the descrambling logic: calculates the scrambling pattern for the content of the message using a fourth secret prime number S and a secret modulus J; and
parses through the encrypted message and reverses the scrambling pattern;
wherein the descrambling logic calculates the scrambling pattern according to the formula:

$$G(S)=S*\bmod(J).$$

35. The system of claim 33, wherein the unifying logic:
calculates the spacing pattern for the content of the message using a third secret prime number R and a second known encryption key K; and
parses through the separated message to reverse the spacing pattern;
wherein the unifying logic calculates the spacing pattern according to the formula:

$$F(R)=R*\bmod(K).$$

36. The system of claim 33, wherein the conversion logic: calculates a secret decryption key D as a function of the known encryption key E, first secret prime number P, and second secret prime number Q; and uses the secret calculated decryption key D to convert the content of the message in the second form M' back into the first form M according to the formula:

$M=(M')^D * \mod(P*Q)$;

wherein the conversion logic calculates the secret decryption key D according to the formula:

$D*E=1*\mod((P-1)*(Q-1))$.

* * * * *